(12) United States Patent
Fritsch et al.

(10) Patent No.: US 7,771,857 B2
(45) Date of Patent: Aug. 10, 2010

(54) PROTON-CONDUCTING POLYMER MEMBRANE

(75) Inventors: Detlev Fritsch, Reinbek (DE); Serge Vetter, Berlin (DE); Suzana Nunes, Geesthacht (DE); Luis Sansores, Revolution (MX); Mikhail Zolotukhin, Universidad (MX)

(73) Assignee: GKSS-Forschungszentrum Geesthacht GmbH (DE)

( * ) Notice: Subject to any disclaimer, the term of this patent is extended or adjusted under 35 U.S.C. 154(b) by 21 days.

(21) Appl. No.: 12/169,181

(22) Filed: Jul. 8, 2008

(65) Prior Publication Data
US 2009/0004528 A1 Jan. 1, 2009

Related U.S. Application Data

(63) Continuation of application No. PCT/EP2007/000166, filed on Jan. 10, 2007.

(30) Foreign Application Priority Data

Jan. 12, 2006 (DE) .................. 10 2006 001 770

(51) Int. Cl.
H01M 8/10 (2006.01)
(52) U.S. Cl. .................... 429/33; 429/30; 521/25; 521/27; 521/30; 525/909; 528/373
(58) Field of Classification Search .................. None
See application file for complete search history.

(56) References Cited

U.S. PATENT DOCUMENTS

| 2004/0121211 | A1 | 6/2004 | Asano et al. |
| 2005/0116206 | A1 | 6/2005 | Kakuta et al. |
| 2005/0124769 | A1 | 6/2005 | Haring |
| 2005/0186460 | A1 | 8/2005 | Kanaoka et al. |
| 2005/0227138 | A1 | 10/2005 | Fukuda et al. |
| 2005/0287410 | A1 | 12/2005 | Saito et al. |

FOREIGN PATENT DOCUMENTS

| WO | 2005059007 | 6/2005 |
| WO | 2007082660 A1 | 7/2007 |

OTHER PUBLICATIONS

Souzy et al. Solid State Ionics 176 (2005) 2839-2848.*
Pena et al. Polymer 46 (2005) 7494-7503.*
German Examination Report for German Application No. 102006001770.6 dated Jan. 16, 2009.
German Examination Report for German Application No. 102006001770.6 dated Sep. 15, 2006.
Hicker, M.A. et al., Alternative Polymer Systems for Proton Exchange Membranes. Chemical Reviews 2004, 104 p. 4587-4612.
Zolotukhin et al., Superacid-Catalyzed Polycondensation of Acenaphthenequinone with Aromatic Hydrocarbons. Macromolecules 2005, 38, 6005-6014.
Pena E.R., et al., Factors enhancing the reactivity of carbonyl compounds for polycondensations with aromatic hydrocarbons. A Computational Study. Marcomolecules 2004, 37, 6227-6235.

* cited by examiner

Primary Examiner—David Wu
Assistant Examiner—Vu Nguyen
(74) Attorney, Agent, or Firm—Michaud-Kinney Group LLP

(57) ABSTRACT

A polymer electrolyte membrane includes a membrane polymer made of monomer units that have aromatic polyarylenes groups with proton-conducting functional groups bound to the aromatic polyarylene groups. The polymer electrolyte membrane can be used as a proton-conducting polymer membrane between the electrodes in a fuel cell.

5 Claims, 3 Drawing Sheets

PROTON-CONDUCTING POLYMER MEMBRANE

CROSS-REFERENCE TO RELATED APPLICATIONS

This application is a continuation of International Application PCT/EP2007/000166, with an international filing date of Jan. 10, 2007, and which was published in German on Jul. 26, 2007 in PCT publication WO2007/082660, and which is hereby incorporated herein by reference, in its entirety. This application claims the priority of German application number DE200610001770, filed Jan. 12, 2006, which is hereby incorporated herein by reference, in its entirety.

FIELD OF THE INVENTION

The invention relates to polymer electrolyte membranes of the kind useful in a fuel cell.

BACKGROUND

Fuel cells are considered to be low-emission alternatives to conventional energy generating processes which point the way to the future. The polymer electrolyte membrane (PEM) fuel cell is of particular interest for mobile applications. A proton-conducting polymer membrane is the central component in this type of fuel cell.

Numerous studies have been carried out on the use of other polymers as membrane materials in fuel cells. However, these polymers are virtually exclusively sulfonated materials whose proton conductivity is attributable to sulfonic acid groups.

PEM fuel cells comprise two electrodes which are separated from one another by a proton-conducting membrane (polymer electrolyte membrane or proton exchange membrane). The electrodes comprise, for example, carbon mats onto which platinum has been deposited by vapor deposition and which are connected to one another via an external electric circuit. For reaction of hydrogen and oxygen to form water to be able to occur, the proton-conducting membrane has to be moistened. The fuel hydrogen is continuously supplied to the anode. The cathode is continually supplied with oxygen. Two types of PEM fuel cells are being developed: low-temperature cells (up to about 90° C.) and high-temperature cells (up to about 180° C.).

The low-temperature cell was developed in the 1960s. Then, a sulfonated polystyrene membrane served as electrolyte. Since 1969, the Nafion® membrane developed by DuPont has been installed in PEM fuel cells. Low-temperature cells are sensitive to carbon monoxide (CO). This gas can block the anode catalyst, which leads to a decrease in power. The membrane has to be moistened for it to be able to conduct protons.

High-temperature cells are insensitive to CO and other impurities. Higher working temperatures in the cell are beneficial to energy management, since they enable more efficient use of the heat produced. Since the membrane conducts protons without water, it does not need to be moistened.

In PEM (polymer electrolyte membrane) fuel cells, the electrolyte which comprises an ion-conducting polymer membrane is the central component of the cell. The requirements which this membrane has to meet are multifaceted and complex: electrochemical and mechanical stability under cell conditions, processability, high ion conductivity and low permeation of the reactants (hydrogen, methanol, oxygen) have to be combined. A polymer electrolyte membrane which meets all these requirements and is also available at a low price does not exist at present.

About 30 years ago, copolymers of tetrafluoroethylene which had been ionically functionalized by sulfonic acid groups were developed for chloralkali electrolysis. These are still the present-day standard polyelectrolytes for fuel cells. The best known and most widely used representative of these polymers is Nafion®, developed and produced by DuPont. The perfluoroalkylenesulfonic acid polymer is sulfonated and accordingly has excellent proton conductivity. The mechanical and electrochemical stability means that Nafion® is suitable as cell membrane.

However, production of the membrane is difficult and expensive. Proton conduction is accompanied with unwanted diffusion of water in Nafion®. If Nafion® is swollen in water, a high ion conductivity is observed. The applications above 100° C. are therefore not possible. However, higher temperatures are desirable because of the sensitivity of the platinum catalysts used to carbon monoxide (CO) at temperatures below 100° C. In practical applications, the hydrogen used as fuel gas is contaminated with traces of CO. This carbon monoxide (CO) represents a great problem for low-temperature fuel cells since it is adsorbed on the platinum surface and thus poisons the catalyst.

During the course of the search for higher efficiencies of primary energy carriers, proton-conducting PEMs have attained increasing importance in the last 10 years. Apart from the polymer Nafion®, which can be considered to be the standard, and fluoropolymers having a similar structure (Aciplex®, Flemion®, Hyflon®Ion), many polymers have been examined as proton conductors (W. Vielstich, A. Lamm, H. A. Gasteiger, Editors, Handbook of Fuel Cells, John Wiley & Sons, New York, 2003 and Hickner, M. A., H. Ghassemi, et al. (2004). "Alternative polymer Systems for proton exchange membranes (PEMs)." Chemical Reviews 104(10): 4587-4611).

For the two main uses of PEMs using hydrogen or methanol (in direct-methanol fuel cells (DMFCs)) as energy source (fuel), a membrane has to meet the following requirements (Hickner, M. A., H. Ghassemi, et al. (2004) loc. cit.): high proton conductivity, low electrical conductivity, low permeability to fuel and oxygen, low diffusive water transport or electroosmosis, high oxidative and hydrolytic stability, good mechanical properties in the dry state and (more importantly) in the hydrated state, low costs and processability to produce membrane-electrode assemblies (MEAs).

Many polymers have been proposed hitherto for PEMs. In the great majority of all examples, the proton transportability was achieved by introduction of sulfonic acid groups either subsequently by means of a suitable sulfonation method or during the synthesis by use of sulfonated monomers.

Thus, aliphatic polymers based on polystyrenes or polyvinyl alcohol in which the stability under PEM conditions was increased by partial fluorination have been proposed. A significantly larger number of sulfonated polymers from the class of aromatic polymers has been examined. Thus, polysulfones, polyether sulfones, polyether ether ketones, polyether ketone ketones, polyimides, poly(4-phenoxybenzoyl-1,4-phenylenes), polyethers (in particular those having tetraphenylphenylene units) and polybenzimidazoles, polybenzothiazoles, polybenzoxazoles, in each case in sulfonated form, have been described (Hickner, M. A., H. Ghassemi, et al. (2004), loc. cit. and Smitha, B., S. Sridhar, et al. (2005). "Solid polymer electrolyte membranes for fuel cell applications—a review." Journal of Membrane Science 259(1-2): 10-26).

Sulfonated or carboxylated polymers are less suitable for proton conduction at temperatures above 100° C. since these groups lose water at high temperatures and the conductivity for protons is therefore significantly reduced. Phosphonium groups are significantly more stable under these conditions and have been favored for use at high temperatures (Stone, C, T. S. Daynard, et al. (2000). "Phosphonic acid functionalized proton exchange membranes for PEM fuel cells." Journal of New Materials for Electrochemical Systems 3(1): 43-50; Jakoby, K., K. V. Peine-mann, et al. (2003). "Palladium-catalyzed phosphonation of polyphenylsulfone." Macromolecular Chemistry And Physics 204(1): 61-67; Lafitte, B. and P. Jannasch (2005). "Phosphonation of polysulfones via lithiation and reaction with chlorophosphonic acid esters." Journal of Polymer Science Part A-Polymer Chemistry 43(2): 273-286; Yamada, M. and I. Honma (2005). "Anhydrous proton conducting polymer electrolytes based on poly(vinylphosphonic acid)-heterocycle composite material." Polymer 46(9): 2986-2992 and DE 101 48 131 A1 with further references).

Fully fluorinated, sulfonated polymers such as Nafion® and the like offer very high stability both toward oxidative attack and to hydrolytic decomposition. However, the formation of toxic fluoride ions in the form of HF (hydrofluoric acid), which result mainly from decomposition of free end groups of the polymer, is observed under use conditions (Curtin, D. E., R. D. Lousenberg, et al. (2004). "Advanced materials for improved PEMFC Performance and life." Journal of Power Sources 131(1-2): 41-48). Distribution of the sulfonic acid groups in the incompatible, fluorinated polymer in this class of polymers results in a fine structure with formation of relatively large, water-filled clusters of sulfonic acid groups. When used as DMFC membrane, the membranes are swollen to a very high degree by the aqueous methanol solution and display an unacceptably high water and methanol transport to the cathode side.

Aliphatic, sulfonated polymers are more prone to oxidative attack than are aromatic polymers. Although fluorination at the susceptible points improves the stability, the formation of fluoride ions or fluorine radicals as toxic degradation product is possible. In the case of aromatic polymers, the required good mechanical properties are generally achieved by means of flexible ether groups in combination with rigid sulfoxide or ketone groups. As a direct consequence, the distribution of the proton-conducting sulfonic acid groups over the polymer chain is not uniform and can lead to poor proton transport when the polymer is swollen to only a small extent (Paddison, S. J. (2003) "Proton conduction mechanisms at low degrees of hydration in sulfonic acid-based polymer electrolyte membranes." Annual Review of Materials Research 33: 289-319). Although proton transport is improved in the strongly swollen state, the disadvantages described in the case of Nafion®, e.g. high water transport, become apparent and the mechanical stability is greatly reduced.

In an article (Li, Q. F., R. H. He, et al. (2003) "Approaches and recent development of polymer electrolyte membranes for fuel cells operating above 100 degrees C." Chemistry of Materials 15(26): 4896-4915), Li et al describe solutions for fuel cell membranes operated at above 100° C. Polybenzimidazole membranes treated with phosphoric acid display particularly good stability. However, trifluoroacetic acid, for example, is used as solvent for producing these membranes (U.S. Pat. No. 5,716,727). This acid has a high vapor pressure at room temperature, is hazardous to health (R20)(Risk phrase 20 of the European Union Chemical Safety laws)) and poses a risk to bodies of water (R52/53). As an alternative, these membranes can also be produced from dimethylacetamide using 2% of LiCl and subsequent doping with phosphoric acid (U.S. Pat. NO. 5,525,436). However, in both cases, the phosphoric acid is not completely bound in the membrane and can migrate out during operation. Diffusion to the catalytic layer generally has an adverse effect on the catalytic reaction and damages the catalyst.

SUMMARY OF THE INVENTION

The present invention relates in one aspect to a polymer electrolyte membrane that includes a membrane polymer made of monomer units that have aromatic polyarylene groups with proton-conducting functional groups bound to the aromatic polyarylene groups.

In another aspect, the present invention relates to an improved fuel cell having a proton-conducting polymer membrane between two electrodes, the improvement comprising that the proton-conducting polymer membrane comprises a polymer electrolyte membrane as described herein.

DETAILED DESCRIPTION

This invention provides a polymer electrolyte membrane that is useful in fuel cells and that comprises a membrane polymer that is made of monomer units that have aromatic polyarylene groups with proton-conducting functional groups bound to the aromatic polyarylene groups.

As a result of the modification of the aromatic polyarylene groups and a uniform or homogeneous distribution or arrangement of the functional proton-conducting groups of the polymer in three-dimensional space, a high hydrolytic and oxidative stability of the membrane polymer is achieved, in particular the homopolymer. At the same time, the proton conductivity of the membrane polymer is increased by a uniform distribution of the proton-conducting groups, for example, sulfonic acid groups.

Here, functional proton-conducting groups, for example sulfonic acid groups, are distributed substantially homogeneously within one or more monomer units, preferably of a homopolymer, as a result of which a substantially uniform distribution of the functional groups is also produced or achieved in the three-dimensional arrangement of the polymer chains of the membrane polymer. Owing to the substantially uniform arrangement of the functional groups in space, not only an increased conductivity of the polymer according to the invention but also a good mechanical stability of the membrane body are achieved.

In one illustrative, non-limiting embodiment, a membrane which has sulfonic acid groups as functional proton-conducting groups, and which is formed from sulfonated polymers comprising polyarylenes as per the following structure

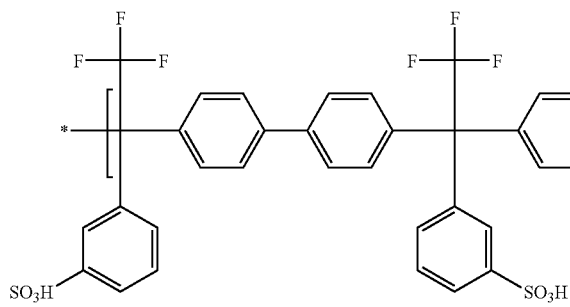

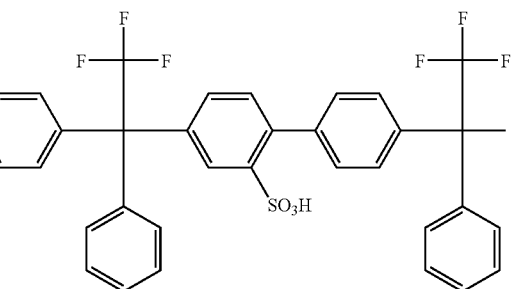

Figure 1:
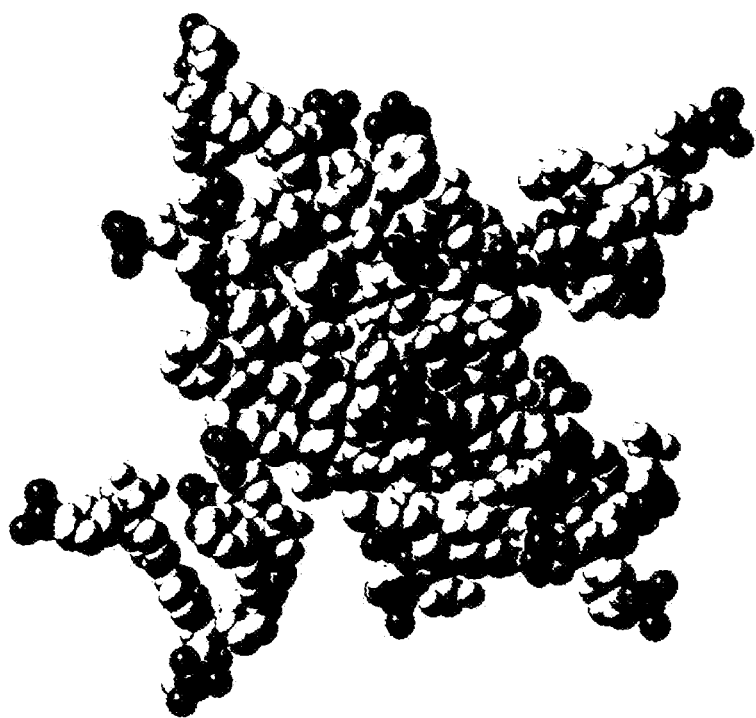
FIG. 1 shows a three-dimensional depiction of a sulfonated polymer according to an illustrative embodiment of the invention.
Figure 1:
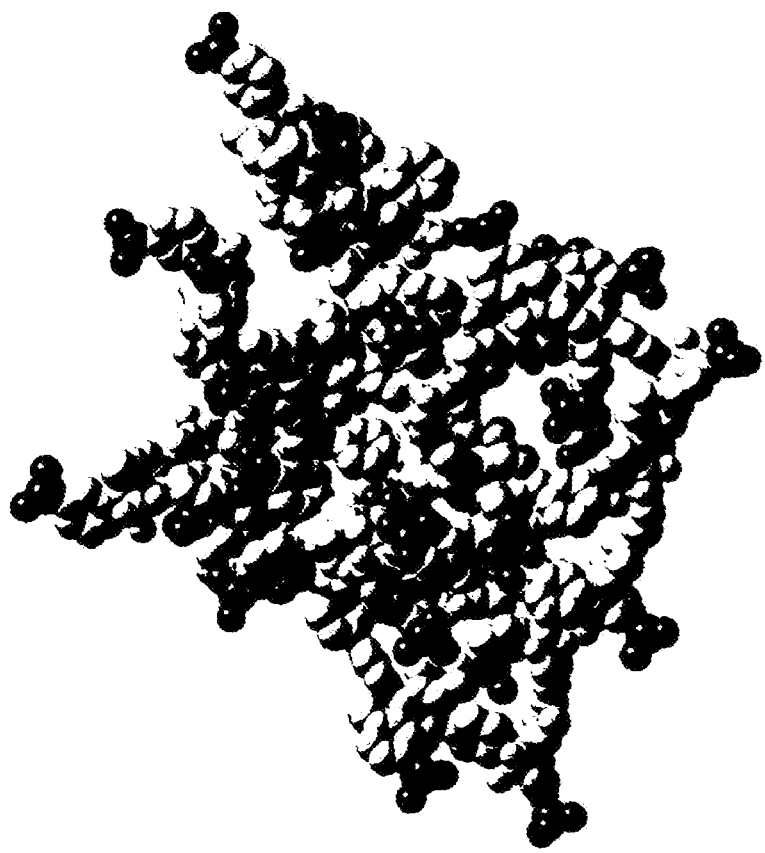

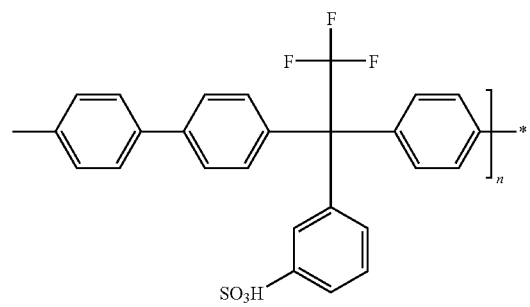

and in which statistically 80% of the 5 monomer units are sulfonated, is provided in this way. FIG. 1 shows a three-dimensional depiction of the sulfonated polymer. This makes the spatial arrangement of the proton-conducting sulfonic acid groups in three-dimensional space clear. FIG. 1 shows three polymer chains each having 11 monomer units and a degree of sulfonation (DS) of 0.8. The sulfonic acid groups as functional groups are shown in black in the images. The right-hand image shows the polymer with a rotation of the y axis by 90° compared to the left-hand image.

In addition, the invention provides for the functional proton-conducting groups to be distributed substantially uniformly in space, i.e. in the polymer or membrane volume, i.e. in three-dimensional space, as a result of which uniform swelling of the membrane or the membrane polymer is achieved. The uniform or substantially homogeneous distribution of the sulfonic acid groups in the membrane polymer is such that the hydrolytic and oxidative stability and at the same time an improved or increased proton conductivity are achieved.

In a preferred embodiment, the invention provides for the proton-conducting functional groups to be in the form of phosphonic acid groups or sulfonic acid groups. Furthermore, the membrane polymer can also have phosphonic groups, so that the simultaneous spatial distribution of the ionic, proton-conducting sulfonic acid groups and the incorporation of the phosphonic groups enables not only an increase in the life of the membrane but also long-term stability of the fuel cell even at temperatures above 100° C. to be achieved.

In another aspect of the invention, the monomer units of the polymer electrolyte membrane of the present invention may include aromatic polyarylene groups having one or more of the following structures (1)-(4):

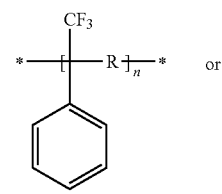

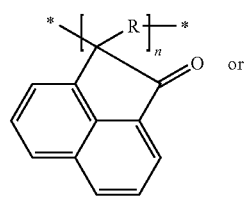

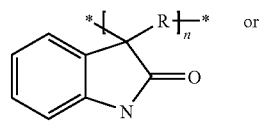 (3)

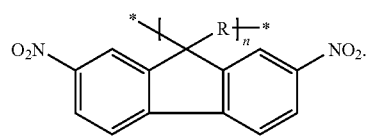 (4)

The radicals R of the monomer units (1)-(4) shown above can have structures of any of the following types (a)-(f):

(a) 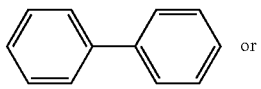 or (b)  or (c) 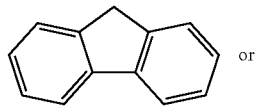 or (d) 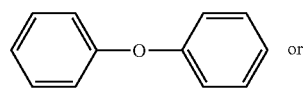 or (e) 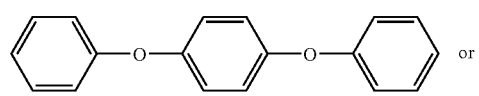 or (f) 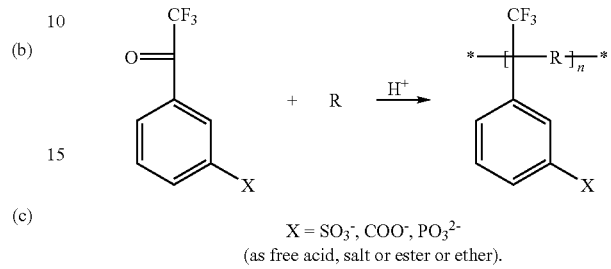.

The preparation of polymers based on aromatic polyarylenes in the presence of acid catalysts, in particular strong acid catalysts such as trifluoromethanesulfonic acid, makes it possible to obtain polymers for the membrane of the invention which, without ether, keto or sulfone groups, can be processed to produce mechanically stable and oxidation- or hydrolysis-resistant films.

Predetermined selection of the monomers also makes it possible to incorporate these functional groups (ether, keto or sulfone groups) into the polymer. Sulfonation, carboxylation or phosphonation of these polymers forms proton-conducting materials or membranes which can be used as PEMs. In addition, use of sulfonated or phosphonated monomers in this polymerization method makes it possible to obtain or access proton-conducting polymers or the polymer electrolyte membrane according to the invention directly according to the scheme

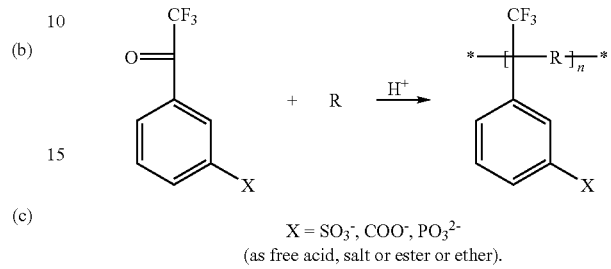

$X = SO_3^-, COO^-, PO_3^{2-}$
(as free acid, salt or ester or ether).

Here, ionic monomers are polymerized directly to form proton-conducting polymers, In addition, protected sulfonated or phosphonated polymers can be converted by appropriate treatment, even in the form of the final membrane film by, for example, treatment with strong acid, into the corresponding free, proton-conducting form. For the purposes of the invention, it is also conceivable for further aromatic polyarylenes to be synthesized or prepared according to the above scheme.

The method of polymerization using strong acids makes it possible to prepare many different polymers which are based on aromatic polyarylenes and in which the proton-conductive groups have a narrow spatial distribution. This is particularly advantageous when used as fuel cell membrane at temperatures above 100° C. both in the case of polymers based on sulfonic acid groups and, in particular, in the case of phosphonated polymers, with operation of a fuel cell above 100° C. giving better carbon monoxide tolerance of the catalyst, better catalytic action of the catalyst (better reaction kinetics) and improved, simple heat energy management of the stack.

A further effect of this particular arrangement of the ionic groups relates to the swelling in the presence of water (also as oxidation product of $H_2$ or methanol or ethanol) and alcohols as liquid fuel. The optimal distribution leads to a more uniform distribution of the swollen regions and thus to an overall better mechanical stability in the swollen state.

The invention is illustrated below with the aid of experiments carried out using various polymers which had been modified differently for comparison in carrying out the experiments to provide non-limiting examples of the present invention. The illustrative polymers examined had the following composition:

| | Monomer unit | Radical R |
|---|---|---|
| Homopolymer (HP) | | |

-continued

| Monomer unit | Radical R |
|---|---|
| Copolymer (CP) 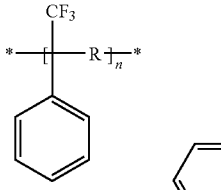 | 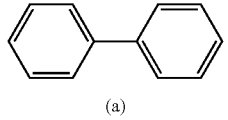 (a) 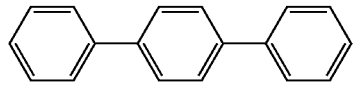 (b) |

Homopolymers are denoted by HP, copolymers by CP.

The copolymers have the same number of radicals (a) and (b).

To determine the materials properties of the polymers prepared, the following methods and instruments were used:

The elemental analyses were obtained using a Carlo Erba CHNS-0 analyzer model EA 1110 and model 1108. The thermogravimetric analysis (TGA), was carried out using a NETZSCH TG 209 at a heating rate of 10° C./minute (min) under argon protective gas. Infrared spectra (IR) were measured on a thin film using an Equinox 55 FT-IR spectrometer from Bruker. $^{13}$C- and $^1$H-NMR (nuclear magnetic resonance) spectra were recorded on a Bruker AC 259 (250 MHz).

Gel permeation chromatography (GPC) for determination of the molar masses was carried out using a set of three columns (GRAM analytical from Polymer Standards Service with 10 micrometer (μm) particles: a precolumn sized at 8*50 millimeters (mm)(inner diameter*length), and analytical columns of Gram 100 Å and Gram 1000 Å porosity, both 8*300 mm). The GPC system comprised a degasser, Knauer analytical HPLC (high pressure liquid chromatography) pump and a Knauer differential refractometer/viscometer double detector. PSS WINGPC software with the universal calibration method was used for evaluation. Column ovens and detector were operated at 50° C. and a flow of 1 millimeters/min.

(ml/min). Dimethylacetamide containing 0.05 molar (M) LiCl was used as eluent to minimize interaction of the sulfonated polymer with the column material. 20 microliter (up) samples having a concentration of 2-5 grams/liter (g/l) were injected.

EXAMPLE 1

Sulfonated Polymers

Polymers of the base structure HP and CP were sulfonated. For this purpose, 2 g of polymer were in each case dissolved in 1,2-dichloroethane to give a 5% strength solution and refluxed with trimethylsilylchlorosulfonic acid under Ar. The reaction conditions are summarized in Table 1.

TABLE 1

Reaction conditions and degree of sulfonation.

| | Ratio of sulfonation reagent/polymer [mol/mol] | Time [h] | C[%] | H[%] | F[%] | S[%] | S/C | Degree of sulfonation DS [%] |
|---|---|---|---|---|---|---|---|---|
| HP-S1 | 1.6 | 24 | 67.9 | 4.13 | 15.6 | 2.65 | 0.039 | 28 |
| | | | 67.8 | 4.07 | 15.6 | 2.81 | 0.041 | |
| HP-S2 | 1.6 | 48 | 66.7 | 4.22 | 14.6 | 4.23 | 0.063 | 45 |
| | | | 66.8 | 4.07 | 14.3 | 4.16 | 0.062 | |
| HP-S3 | 1.6 | 72 | 59.4 | 3.74 | 13.1 | 5.79 | 0.097 | 66 |
| | | | 59.1 | 3.54 | 13.1 | 5.80 | 0.098 | |
| CP-S1 | 1.6 | 24 | 68.7 | 4.05 | 12.5 | 2.88 | 0.042 | 35 |
| | | | 68.3 | 4.02 | 13.1 | 3.05 | 0.044 | |
| CP-S2 | 1.6 | 40 | 64.3 | 3.90 | 16.1 | 4.27 | 0.066 | 53 |
| | | | 64.3 | 4.05 | 13.9 | 4.33 | 0.067 | |

After 24 to 72 hours (h), the polymers were cooled to room temperature and precipitated by pouring the solution slowly into a large excess of methanol.

The colorless, fiber-forming polymer was filtered off, washed with methanol and dried at 100° C. in a convection drying oven for 24 h. A degree of sulfonation of from 28 to 66% was calculated from the elemental analysis. The degree of sulfonation (DS) can be controlled in a simple manner via the reaction time. Further polymer properties are summarized in Table 2.

TABLE 2

Data of the GPC, IR and TGA analyses

GPC data in DMAc/LiCl at 50° C.

| | Mw, [g/mol $10^3$] | Mw/Mn | Mp [g/mol $10^3$] | [η] [cm$^3$/g] | IR (film) [cm$^{-1}$] | $T_{10}$ [° C.] (10% by weight loss under Ar) | Residue at 500° C. RW in % |
|---|---|---|---|---|---|---|---|
| HP-S1 | 204 | 2.7 | 96 | — | 1228 ($v_{as}$ SO$_2$) 1005 ($v_s$ SO$_2$) 625 (C—S) | 400 | 85 |
| HP-S2 | — | — | — | — | 1228 ($v_{as}$ SO$_2$) 1005 ($v_s$ SO$_2$) 623 (C—S) | — | — |
| HP-S3 | — | — | — | — | 1228 ($v_{as}$ SO$_2$) 1005 ($v_s$ SO$_2$) 625 (C—S) | — | — |
| CP-S1 | 360 | 5 | 94 | 10.7 | 1230 ($v_{as}$ SO$_2$) 1005 ($v_s$ SO$_2$) 622 (C—S) | 400 | 84 |
| CP-S2 | 670 | 7 | 677 | 13.5 | 1229 ($v_{as}$ SO$_2$) 1004 ($v_s$ SO$_2$) 623 (C—S) | 350 | 78 |

Example 1 shows that an increase in the sulfonation time leads to higher, uniformly increasing degrees of sulfonation. Thus, any desired degrees of sulfonation can be set via the time.

The NMR data are shown in Table 3.

TABLE 3

NMR data for the polymers HP-S1, HP-S3 and CP-S1 and DMSO-d6.

| | $^1$H-NMR, δ | $^{13}$C-NMR, δ |
|---|---|---|
| HP-S1 | 8.0 br s, 7.85-7.60 br s, 7.42 s, 7.25-7.0 m | 139.3, 139.8, 131.0, 130.0, 129.0, 127.5 |
| HP-S3 | 8.27 br s, 7.81 br s, 7.68 m, 7.44 s, 7.20 br s, 7.04 br s | |
| CP-S1 | 8.27 br s, 7.81 br m, 7.69 m, 7.44 s, 7.21 br s, 7.04 br s | |

EXAMPLE 2

Bromination of Homopolymer HP from Example 1

To produce a brominated polymer, 2 g of polymer from Example 1 were dissolved in 20 ml of chloroform and heated to 60° C. with 60 milligrams (mg) of iron powder ("ferrum reductum") while stirring and admixed at this temperature with 2.33 g of bromine. After the addition was complete, stirring was continued at 60° C. for 24 h. The brominated polymer was precipitated in a large excess of methanol, filtered off and washed. It was redissolved in chloroform and washed with dilute sodium hydrogensulfite solution, precipitated in methanol, filtered off and dried at 60° C. in a convection drying oven. This gave 2.66 g of brominated, colorless polymer. The brominated homopolymer was tested, with the following results:

IR (film): 1598 (w, C=C), 1477 (m, C=C), 1226 (s), 1149 (ss, C—F), 1002, 820 (m), 700 (m) cm$^1$.

Elemental analysis: found: C 54.60, 54.90; H 2.59, 2.75; Br 22.1, 22.1; F 12.4, 12.4.

An average bromination of 1.1 atoms of Br per monomer unit can be calculated from the elemental analysis.

EXAMPLE 3

Bromination of Copolymer CP from Example 1

A copolymer was brominated by the same method as in Example 2. Amounts used: 1.0 g of copolymer, 30 mg of iron powder, 10 ml of chloroform, 1.5 g of bromine. Yield: 1.45 g of colorless polymer. The brominated copolymer was tested as described above, and the following results were obtained:

IR (film): 1598 (m, C=C), 1465 (s, C=C), 1228 (ss), 1155 (ss, C—F), 1004 (m), 811 (s), 701 (s) cm$^1$ 1H-NMR (CDCl$_3$, TMS, ppm): δ=7.8 br s, 7.7 br s, 7.6 br s, 7.05-7.5 m, (aromatic protons).

Elemental analysis: found: C 50.30, 50.30; H 3.97, 4.18; Br 32.9, 32.9; F 12.2, 12.2.

EXAMPLE 4

Phosphonation of the Brominated Homopolymer from Example 2

1.406 g of brominated homopolymer were dissolved in 5 ml of dichlorobenzene (DCB), 2 ml of HP(O) (OEt)$_2$, 0.5 ml of Et$_3$N under a nitrogen atmosphere and heated to 90° C. 30 mg of tris(dibenzylideneacetone)dipalladium(0)-chloroform adduct in 5 ml of DCB and a further 2 ml of HP(O) (OEt)$_2$ and 0.5 ml of Et$_3$N were added to this solution.

The mixture was stirred at 90° C. for 48 hours. After addition of a fresh portion of the catalyst, the temperature was increased to 120° C. and the mixture was stirred for a further 72 hours. The reaction mixture was cooled, filtered and precipitated in MeOH. The phosphonated product was filtered off and dried in a convection drying oven. Yield: 1.22 g. The phosphonated, brominated homopolymer was tested as described above, and the following results were obtained:

IR (film): 1230 (s, P=O), 1023 (s, POC) cm$^{-1}$.

$^{31}$P: δ=2.58 ppm. $^1$H-NMR DMSO-d$_6$, TMS: δ=7.1-7.9 ppm (Ar—H, 12H, m), 3.7-4.0 (OCH$_2$—CH$_3$, 4H, m), 1.1-1.4 (OCH$_2$—CH$_3$, 6H, m) $^{13}$C-NMR DMSO-d$_6$, TMS:

δ=139.33, 130.47, 129.85, 129.33, 129.17, 128.33, 128.17, 127.66, 126.74, 126.57, 62.31, 62.14, 52.47, 15.94.

EXAMPLE 5

Phosphonation of a Brominated Copolymer from Example 3

0.733 g of brominated copolymer was reacted by the method of Example 4. This gave 0.396 g of phosphonated copolymer. The phosphonated, brominated copolymer was tested as described above, and the following results were obtained:

IR (film): 1233 (s, P=O), 1023 (s, POC) cm$^{-1}$

1H NMR (CDCl$_3$, TMS, ppm) : δ=7.2-7.8 (13H, aromatic protons) m, 3.8-4.2 (4H, OC$\underline{H}_2$CH$_3$) m, 1.0-1.2 (6H, OCH$_2$C$\underline{H}_3$) m.

Elemental analysis: found: C 56.60, 56.70; H 5.26, 5.29; Br 5.42, 5.58; F 8.26, 8.49; P 7.70, 6.7.

EXAMPLE 6

Conductivity Measurement by Impedance Spectroscopy

The conductivity measurement was carried out by a method described by Alberti (G. Alberti, M. Casciola, L. Massinelli, B. Bauer, J. Membrane Science 185 (2001) 73-81). Membranes having a diameter of 12 mm were placed between two gas diffusion electrodes (E-TEK) having a diameter of 8 mm and pressed together by means of porous stainless steel cylinders. The measurements were carried out using an impedance spectrometer (Zahner IM6) in the frequency range from 1 kHz to 1 MHz at an amplitude of <100 mV. The impedance data were corrected for the resistance of the cell without membrane.

For the measurement, six films were in each case placed together in order to ensure a sufficiently high resistance of the membrane compared to the cell. The resistance value obtained was divided by the total thickness of the membrane stack, with the transition resistance between the membranes being disregarded. For the measurement, the membranes were treated in deionized water. The conductivity through the membranes was measured at temperatures rising from 50° C. to 100° C., at a humidity of 100%. The temperature was then reduced in a number of stages to 50° C. for further measurements. The conductivity increases significantly with the degree of sulfonation. The best values were achieved for a degree of sulfonation of 66%.

Figure 2:
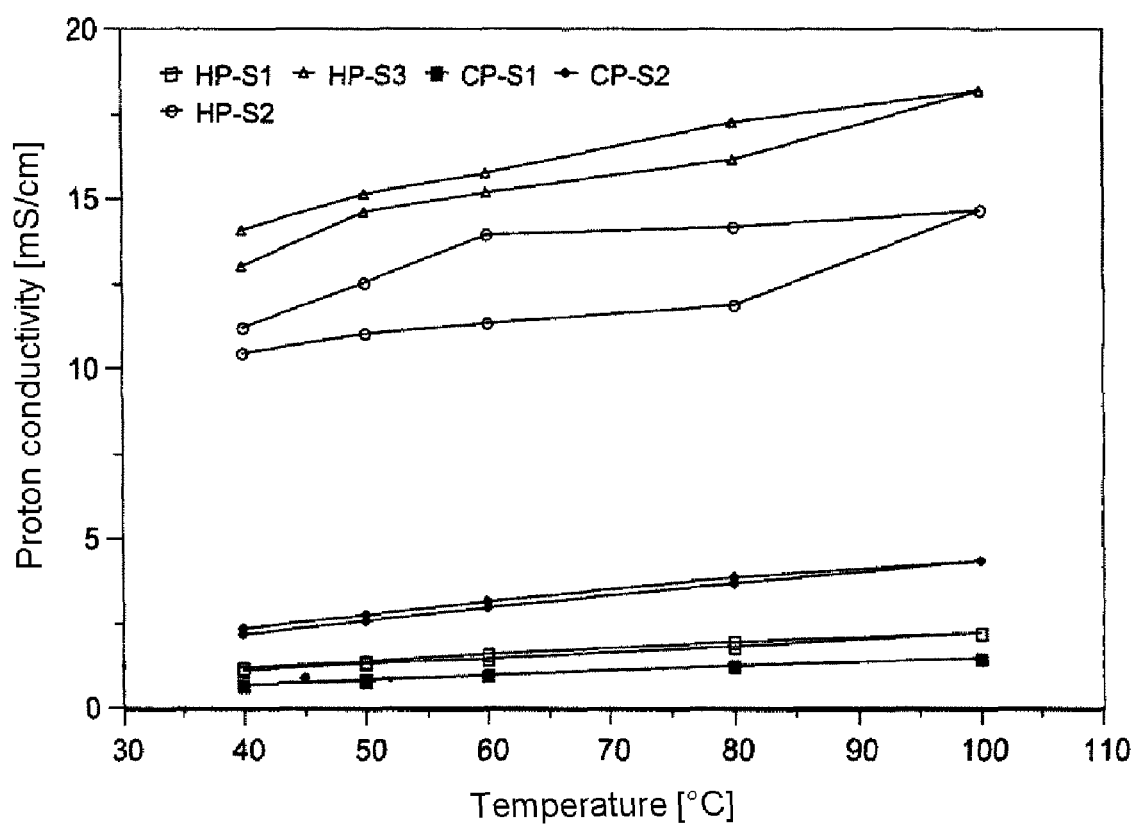
FIG. 2 shows the proton conductivity of the differently sulfonated polymers from Example 1 as a function of the degree of sulfonation and the structure.

FIG. 2 shows the proton conductivity of the differently sulfonated polymers from Example 1 as a function of the degree of sulfonation and the structure. The measured proton conductivity values are plotted in this Figure. The open symbols represent the homopolymers HP-S1 to HP-S3 (Example 1) having increasing degrees of sulfonation of 28, 45 and 66%. A significant increase in the conductivity can be seen.

The most highly sulfonated homopolymer HP-S3 having a degree of sulfonation DS of 66% has very good mechanical strength in the water-swollen state. It can be concluded from this that the polymers which can be obtained by means of a longer reaction time and have higher degrees of sulfonation will display a significantly better conductivity.

It can also clearly be seen from FIG. 2 that the copolymers CP-S1, CP-S2 having sulfonic acid groups which are further apart in space and thus have a less uniform distribution at the same degree of sulfonation display a significantly lower conductivity. These values are shown in Table 4.

TABLE 4

Comparison of the proton conductivity at 100° C. of homopolymers and copolymers

| | Degree of sulfonation [%] | Ion exchange capacity (IEC), [mequiv/g] | Proton conductivity [mS/cm] |
|---|---|---|---|
| Homopolymer | | | |
| HP-S1 | 28 | 0.84 | 2.2 |
| HP-S2 | 45 | 1.30 | 14.7 |
| HP-S3 | 66 | 1.82 | 18.2 |
| Copolymer | | | |
| CP-S1 | 35 | 0.93 | 1.5 |
| CP-S4 | 53 | 1.34 | 4.3 |

EXAMPLE 7

Synthesis of Sulfonated 2,2,2-trifluoroacetophenone 17.4 g (0.1 mol) of 2,2,2-trifluoroacetophenone were dissolved in 50 ml of dry chloroform, and 24.7 g (0.2 mol of SO$_3$) of 65% oleum were added over a period of 30 minutes while stirring and cooling in an ice bath. The reaction mixture was subsequently refluxed at 55° C. for 4 hours while stirring and was, after cooling to room temperature, poured onto an ice/water mixture.

The pH was brought to 8 by means of sodium hydrogencarbonate and the organic phase was separated off. The aqueous phase was evaporated to dryness and the product was extracted a number of times with ethanol (15.7 g, 57% yield of sodium sulfonate).

The product was tested by NMR with the following results:

$^{13}$C-NMR (D$_6$-DMSO): 196.0 ppm (C=O), 181.4 ppm (C—F), 158.4 ppm (Ar—S), 138.2, 136.7, 135.1, 130.3 ppm (Ar).

EXAMPLE 8

Polymerization of Sulfonated 2,2,2-trifluoroacetophenone 10 ml of trifluoromethanesulfonic acid were slowly added to a mixture of 2.79 g (10 mmol) of sulfonated 2,2,2-trifluoroacetophenone, 1.56 g (10 mmol) of biphenyl in 10 ml of dichloromethane while cooling in ice and stirring vigorously. After removal of the ice bath, the polymerization mixture was stirred at room temperature for three days. The reaction mixture solidified and became dark during this time. Solvent and trifluoromethanesulfonic acid were extracted by means of methanol and a dark polymer was obtained in quantitative yield.

EXAMPLE 9

Hydrolysis of Phosphonated Polymer or Copolymer from Examples 4 and 5

Polymer (0.6 g, from Example 4) or copolymer were suspended in concentrated hydrobromic acid and stirred at 70° C. for 48 hours. After cooling, the mixture was poured onto ice water, filtered off and washed with water until neutral. This gave 0.525 g of homopolymer having free phosphonic groups. The homopolymer is soluble in DMSO (dimethylsulfoxide) and NMP (1-methyl-2-pyrrolidinone) and forms flexible films which swell little in water.

Data for hydrolyzed homopolymer:

$^{31}$P: δ=13.99 ppm. $^{1}$H-NMR DMSO-d$_6$, TMS: δ=7.1-8.0 ppm (m). $^{13}$C-NMR DMSO-d$_6$, TMS: δ=143.58, 141.06, 138.76, 137.97, 131.99, 131.28, 130.17, 129.53, 128.67, 126.92, 64.55, 64.36.

EXAMPLE 10

Proton Conductivity of Hydrolyzed Homopolymer as Described in Example 9

The conductivity of a film of hydrolyzed homopolymer as described in Example 9 was measured by means of impedance spectroscopy as described in Example 6. Two successive measurements were carried out in the temperature range from 60 to 150° C.

Figure 3:
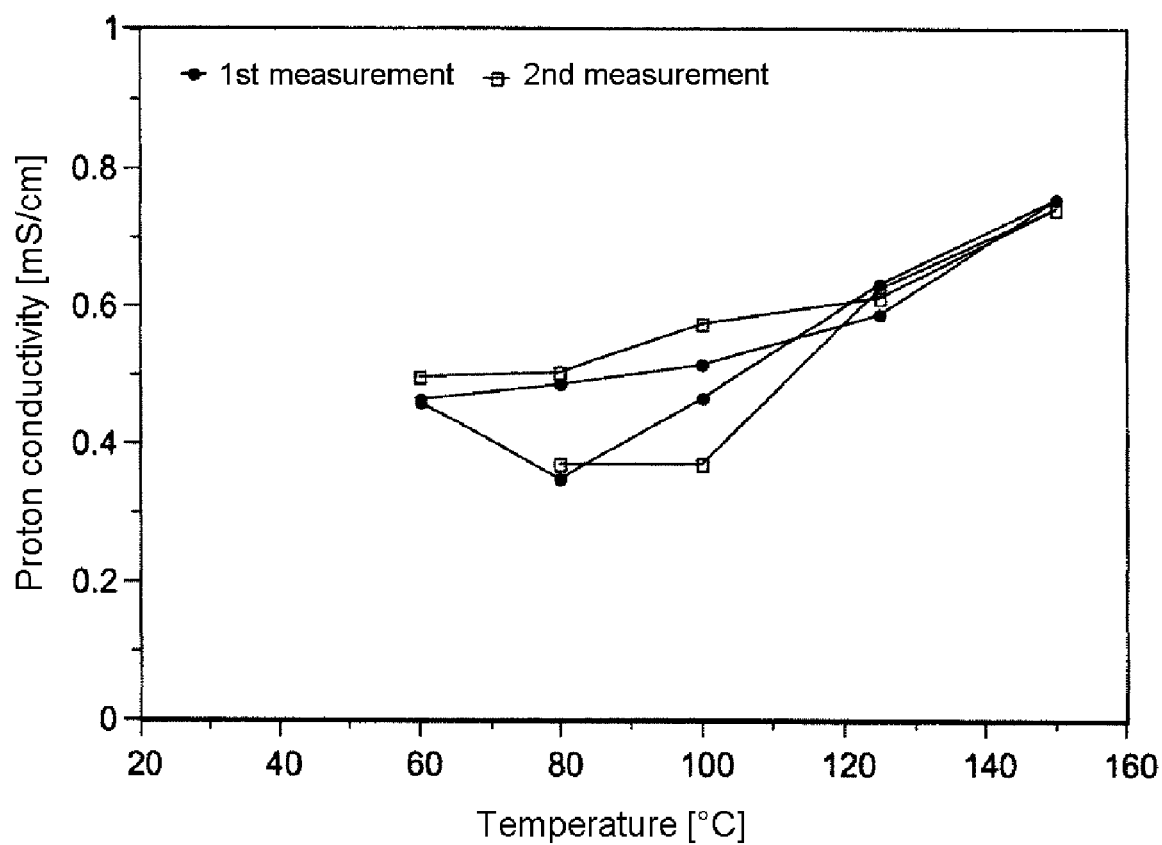
FIG. 3 shows the proton conductivity of the differently sulfonated polymers from Example 9 as a function of the degree of sulfonation and the structure.

The data are shown in FIG. 3 and show good reproducibility and stability of the membrane at high values for the proton conductivity of phosphonated polymers.

Although the invention has been described with reference to particular embodiments thereof, it will be understood by one of ordinary skill in the art, upon a reading and understanding of the foregoing disclosure, that numerous variations and alterations to the disclosed embodiments will fall within the scope of this invention and of the appended claims.

What is claimed is:

1. A polymer electrolyte membrane comprising a membrane polymer made of monomer units that have aromatic polyarylene groups with proton-conducting functional groups bound to the aromatic polyarylene groups;

the monomer units comprising a number n of radicals R, the monomer units having at least one of the following structures:

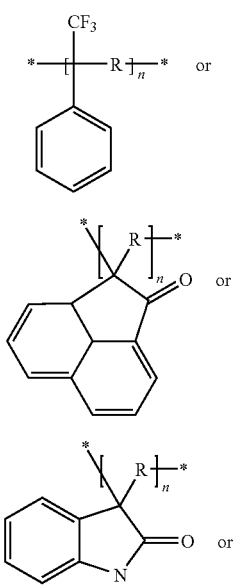

-continued

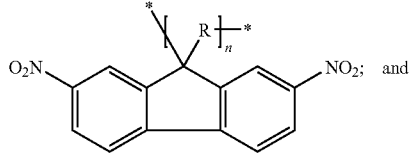

the radicals R having at least one of the following structures:

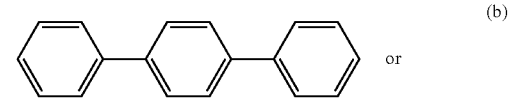

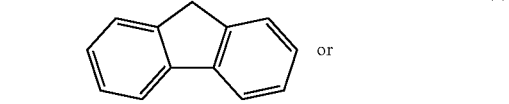

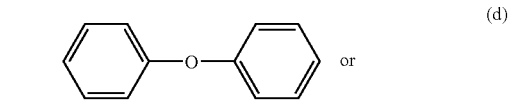

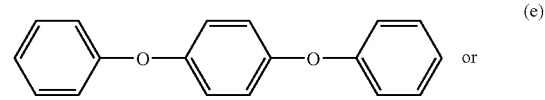

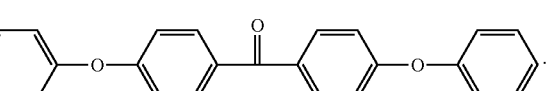

2. The polymer electrolyte membrane as claimed in claim 1, wherein the proton-conducting functional groups are substantially uniformly distributed.

3. The polymer electrolyte membrane as claimed in claim 1, wherein the proton-conducting functional groups include phosphonic acid groups, sulfonic acid groups, or both.

4. The polymer electrolyte membrane as claimed in claim 1, wherein the polymer electrolyte membrane can be obtained according to the following scheme

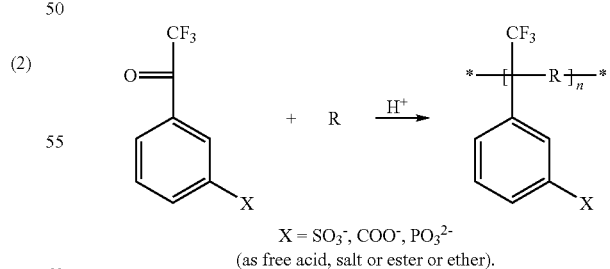

X = SO$_3^-$, COO$^-$, PO$_3^{2-}$
(as free acid, salt or ester or ether).

5. In a fuel cell having a proton-conducting polymer membrane between two electrodes, the improvement comprising that the proton-conducting polymer membrane comprises the polymer electrolyte membrane of claim 1.

* * * * *

UNITED STATES PATENT AND TRADEMARK OFFICE
CERTIFICATE OF CORRECTION

PATENT NO. : 7,771,857 B2
APPLICATION NO. : 12/169181
DATED : August 10, 2010
INVENTOR(S) : Fritsch et al.

It is certified that error appears in the above-identified patent and that said Letters Patent is hereby corrected as shown below:

Title Page, Item (73) Assignees of the patent should read:
Helmholtz-Zentrum Geesthacht Zentrum fur Material-und Kustenforschung GmbH; and
National Autonomous University of Mexico Signed and Sealed this
Thirtieth Day of April, 2013

Teresa Stanek Rea
*Acting Director of the United States Patent and Trademark Office*